A. F. Duckwitz,
Rake.
No. 97,368. Patented Nov. 30, 1869.

Witnesses:
L. Becker.
Alex F. Roberts

Inventor:
A. F. Duckwitz
per
Mmmf,
Attorneys.

United States Patent Office.

A. F. DÜCKWITZ, OF NEW YORK, N. Y.

Letters Patent No. 97,368, dated November 30, 1869.

IMPROVEMENT IN COMBINED RAKE, WEEDER, AND SMOOTHER.

The Schedule referred to in these Letters Patent, and making part of the same.

*To all whom it may concern:*

Be it known that I, A. F. DÜCKWITZ, of the city, county, and State of New York, have invented a new and useful Improvement in Combined Rake, Weeder, and Smoother; and I do hereby declare the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish an improved instrument, which shall be so constructed as to adapt it for use as a rake, as a weeder for cutting off the weeds in walks, and other places, and as a smoother for smoothing off the surface, after it has been properly raked; and It consists in the combined instrument, constructed as hereinafter more fully described.

A are the rake-teeth, which are formed upon or attached to a bar or head, B, in the ordinary manner.

Figure 1:
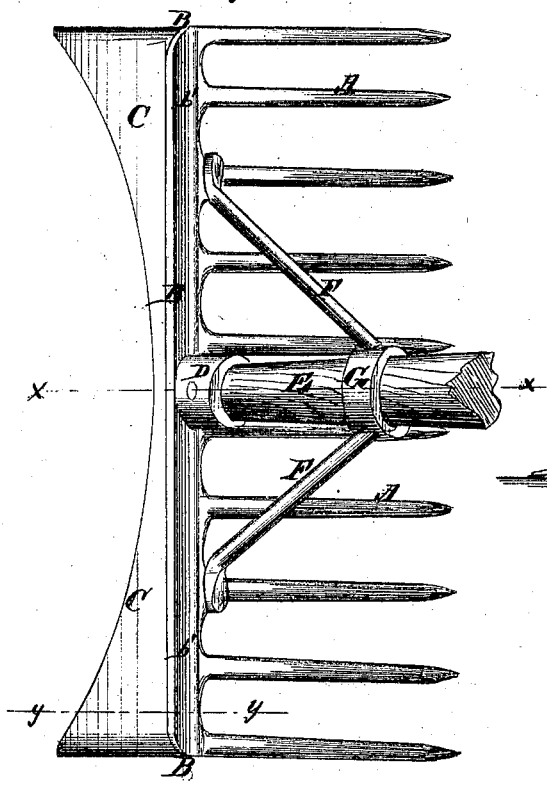
Figure 1 is a top view of my improved instrument, in position for use as a rake.

Upon the rear edge of the back or bar B, is formed a flange, C, projecting rearwardly, at a suitable angle, drawn to an edge, and concaved, as shown in fig. 1.

Figure 2:
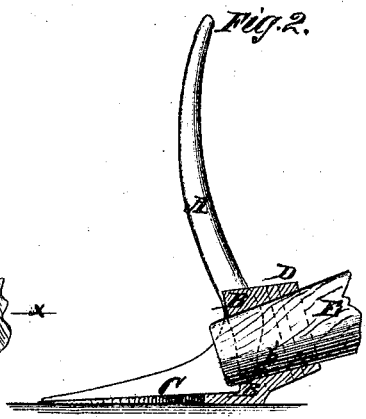
Figure 2 is a cross-section of the same, taken through the line $x\ x$, fig. 1, in position for use as a weeder.
Figure 3:
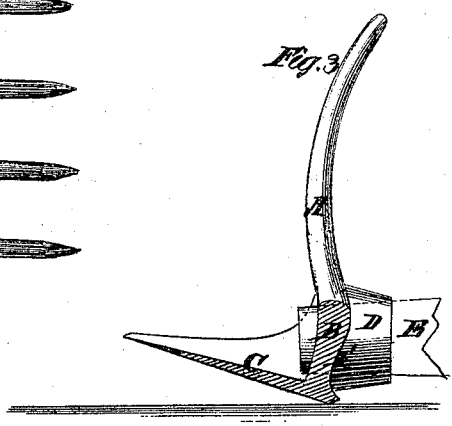
Figure 3 is a cross-section of the same, taken through the line $y\ y$, fig. 1, in position for use as a smoother.

The back of the bar or head B is bevelled off, as shown in figs. 1, 2, and 3, and upon its forward side is formed a longitudinal groove, $b'$, as shown in fig. 3, and in dotted lines in fig. 2.

In the centre of the bar or head B is formed a socket or eye, D, in which the end of the handle E is secured.

The connection between the head B and the handle E is strengthened by the braces F, the ends of which are securely attached to or formed solid with the said bar or head.

To the other or outer ends of the braces F is attached, or upon them is formed, a ring, G, through which the handle E passes, as shown in fig. 1.

The rake part of the instrument may be used for any of the purposes for which an ordinary rake may be used.

In using the instrument as a weeder, it is held in about the position shown in fig. 2, and is pushed forward, cutting off the weeds at or just beneath the surface.

After the surface has been properly raked off, it may be smoothed, by holding the instrument in about the position shown in fig. 3, the upward inclination of the flange or weeder C enabling it to slide over and press down the loose soil over which it passes.

By holding the instrument in about the same position as shown in fig. 3, and drawing it in an inclined or direct direction toward the operator, pebbles, and other loose substances, may be conveniently removed, the bevelled edge and groove $b'$ adapting it for this use.

Having thus described my invention,

I claim as new, and desire to secure by Letters Patent—

The implement formed by the combination, with the bar or back B, of the teeth A and cutter C, said parts being constructed and arranged as shown and described.

A. F. DÜCKWITZ.

Witnesses:
GEO. W. MABEE,
ALEX. F. ROBERTS.